TAPE DEVICE WITH ZONE
Filed March 8, 1968
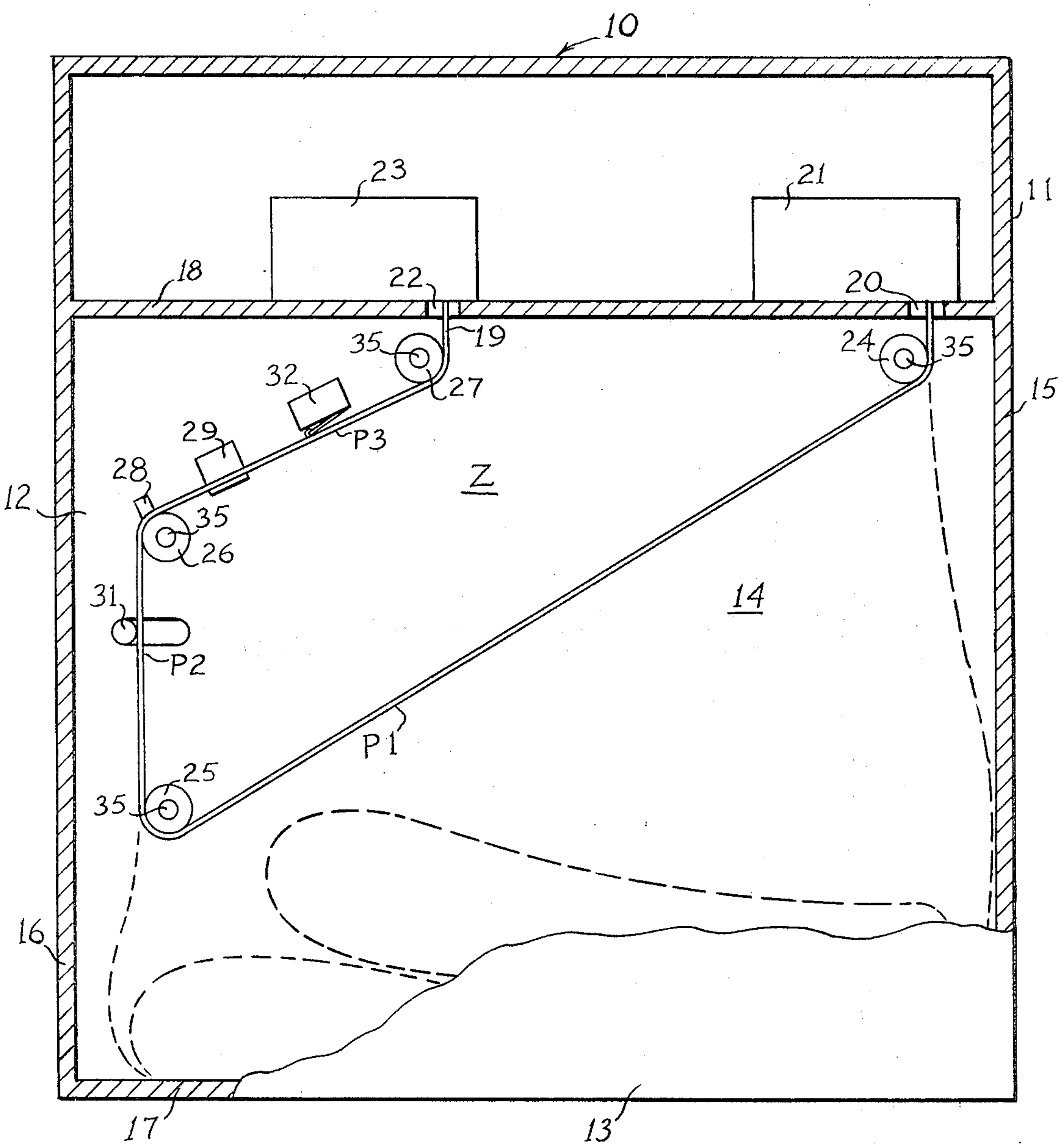
INVENTOR
Fred C. Bolick, Jr.
BY
Jones & Thomas
ATTORNEYS United States Patent Office 3,519,185
Patented July 7, 1970

3,519,185

TAPE DEVICE WITH ZONE

Fred C. Bolick, Jr., Atlanta, Ga., assignor to Lanier Electronic Laboratory, Inc., Atlanta, Ga., a corporation of Georgia Filed Mar. 8, 1968, Ser. No. 711,716
Int. Cl. B65h *17/20*
U.S. Cl. 226—118 15 Claims

ABSTRACT OF THE DISCLOSURE

A tape device in which a plurality of tape driving units feed an endless tape into and remove the endless tape from a tape magazine and which includes a zone means for forming a zone and a plurality of predetermined tape paths within the tape magazine. The zone is positioned within the tape magazine relative to a tape driving uint so that a subsantial length of the tape may always be fed into the tape magazine by a tape driving unit even though the tape device includes a motion restricting means and an erasing means. The plurality of tape paths define the sides of the zone and motion of the tape into the plurality of tape paths provides for reliable operation of various control elements.

BACKGROUND OF THE INVENTION

Field of the invention

This invention relates to tape devices and more particularly to a tape device in which a tape is fed into and removed from a tape magazine by a plurality of tape driving units and which includes a zone means for providing a zone within the tape magazine for receiving the tape during a mode of operation of the tape device and for providing a plurality of tape paths within the tape magazine.

Brief description of the prior art

In tape devices such as those in which a magnetizable tape is fed into and removed from a tape magazine by each of a plurality of tape driving units, it is customary to provide a motion restricting means for restricting motion of the tape by a tape driving unit when the position of the tape within the tape magazine is such that a particular motion of the tape could result in tape breakage. It is also customary to provide an erasing means in the tape magazine for erasing previously recorded material from the tape as the tape is withdrawn from the tape magazine by a tape driving unit.

Although a motion restricting means and an erasing means are both desirabl in a practical tape device, a motion restricting means and an erasing means have caused difficulties in many prior art tape devices. This is because a motion restricting means has generally been positioned within a tape magazine so as to be operative when substantially all of the tape has been removed from the tape magazine and a segment of the tape is extending in a substantially horizontal path across the upper portion of the tape magazine and because an erasing means frequently restricts motion of the tape into the tape magazine in such a manner that the tape fed into the tape magazine by a tape driving unit must accumulate above the segment of the tape in the substantially horizontal path.

The result of the tape accumulating in a tape magazine above a segment of the tape in a substantially horizontal path across the upper portion of the tape magazine is that portions of the tape frequently become entangled with each other or a portion of the tape may be forced from the tape magazine if a substantial length of the tape is fed into the tape magazine above the segment of the tape in the substantially horizontal path. Moreover, the forcing of the tape into the limited space in the tape magazine about the segment of the tape in the substantially horizontal path frequently interferes with the operation of the motion restricting means and other control elements positioned within the tape magazine.

SUMMARY OF THE INVENTION

The invention disclosed herein overcomes these and other difficulties encountered with a prior art tape device having a motion restricting means and an erasing means. This is because the invention is a tape device having a zone within the tape magazine into which a substantial length of the tape is fed without portions of the tape becoming entangled and without a portion of the tape being forced from the tape magazine even though a motion restricting means is operative and even though the tape device includes an erasing means. Moreover, the sides of the zone in the tape device are defined by a plurality of tape paths within the tape magazine which provide for more reliable operation of a motion restricting means and of other control elements than has been possible in a prior art tape device.

These improvements in a tape device are provided in a tape device having a zone means for forming a zone within a tape magazine and for providing a plurality of tape paths within the tape magazine. In that embodiment of the invention disclosed herein, the zone means is a plurality of rollers positioned within the tape magazine to define three tape paths within the tape magazine which, in turn, define the sides of a three-sided zone.

During operation of the tape device, the positioning of the tape within the tape magazine in one or more of the three tape paths defined by the rollers provides tape motion within the tape magazine for the reliable operation of a motion restricting means or other control element positioned within the tape magazine. Under those operating conditions of the tape device when the tape magazine is substantially empty of tape, the tape in the tape magazine is prevented by the rollers from entering the zone except during operation of the tape device in a particular mode of operation so as to insure that the zone provides space for the tape during this mode of operation.

It is because of the zone provided by the zone means that the invention provides a tape device into which tape may be fed during a particular mode of operation of the tape device without portions of the tape becoming entangled with each other and without a portion of the tape being forced from the tape magazine even though the tape device includes a motion restricting means and an erasing means. It is because of the plurality of tape paths provided by the zone means that the invention provides a tape device in which the operation of a motion restricting means and other control elements is more reliable than in a prior art tape device.

DESCRIPTION OF THE DRAWING

These and other features and advantages of the invention will be more clearly understood from the following detailed description and the accompanying drawing in which the figure is a schematic presentation of a tape device embodying the invention disclosed herein.

DESCRIPTION OF AN EMBODIMENT

This figure and the following detailed description disclose a specific embodiment of the invention. However, it will be understood that the invention may be embodied in other equivalent forms.

The invention disclosed herein is most easily understood in terms of a tape device such as that disclosed in co-pending U.S. patent application Ser. No. 553,506 filed May 27, 1966, now U.S. Pat. No. 3,415,434, or in co-pending U.S. patent application Ser. No. 672,797, filed Oct. 4, 1967 now U.S. Pat. No. 3,467,790. This is because the invention disclosed may be embodied in a tape device such as that disclosed in either of these two co-pending U.S. patent applications by including a zone means for forming a zone within a tape magazine and for providing a plurality of tape paths within the tape magazine. It is for this reason that a tape device 10 is only generally shown in the figure and that the circuitry and many of the components of the tape device 10 required to provide its many modes of operation are not shown in the figure or described in the description to follow.

Considering the figure, it will be seen that the tape device 10 includes a housing 11 within which a tape magazine 12 is formed by substantially parallel sides 13 and 14, substantially parallel end members 15 and 16, a bottom member 17, and a top member 18. An endless tape such as a magnetic tape 19 on which material is recorded or from which material is transcribed is fed into and removed from the tape magazine 12 through a first aperture 20 by a first tape driving unit 21 and is fed into and removed from the tape magazine 12 through a second aperture 22 by a second tape driving unit 23. It will be understood that the tape driving units 21 and 23 are operable independently of each other and that the tape driving units 21 and 23 are operative to feed the tape 19 into and to remove the tape 19 from the tape magazine 12 so as to provide the plurality of modes of operation of the tape device 10 which are required for the recording and transcribing of material on the tape 19.

Positioned within the tape magazine 12 adjacent the first aperture 20 is a first roller 24 and positioned within the tape magazine 12 adjacent the end member 16 and substantially lower in the tape magazine 12 than the first roller 24 is a second roller 25. Positioned within the tape magazine 12 above the second roller 25 but lower in the tape magazine 12 than the first roller 24 is a third roller 26 and positioned within the tape magazine 12 adjacent the second aperture 22 is a fourth roller 27.

The rollers 24, 25, 26 and 27 extend from adjacent the side 13 to adjacent the side 14 of the tape magazine 12 and are rotatably mounted on shafts 35 attached to and extending between the sides 13 and 14 of the tape magazine 12. Thus, the rollers 24, 25, 26 and 27 serve to limit motion of the tape 19 within the tape magazine 12. It is because of this that the roller 24, 25, 26 and 27 serve as a zone means for providing a zone Z within the tape magazine 12 and for providing a plurality of tape paths P–1, P–2, and P–3.

The sides of the zone Z are defined by the tape paths P–1, P–2, and P–3 and the tape paths P–1, P–2, and P–3 are formed within the tape magazine 12 by the rollers 24, 25, 26, and 27 during an operating condition of the tape device 10 in which substantially all of the tape 19 has been removed from the tape magazine 12 by the operation of one or both of the tape driving units 21 and 23. When the tape device 10 is in this operating condition, the tape 19 extends in the tape path P–1 from the first roller 24 to the second roller 25, in the tape path P–2 from the second roller 25 to the third roller 26, and in the tape path P–3 from the third roller 26 to the fourth roller 27.

The tape paths P–1, P–2, and P–3 are shown in solid line in the figure from which it will also be seen that a friction member 28 urges the tape 19 against the third roller 26 and that the tape 19 passes through an erasing means such as a conventional erasing unit 29 as the tape 19 passes from the third roller 26 toward the fourth roller 27. It will be understood that the tape paths P–1, P–2, and P–3 are substantially straight and that with the tape 19 in the tape paths P–1, P–2, and P–3, operation of either the first tape driving unit 24 or the second tape driving unit 25 in a mode of operation that removes the tape 19 from the tape magazine 12 could cause breakage of the tape 10.

It will also be understood that operation of the first tape driving unit 21 to feed the tape 19 into the tape magazine 12 causes the tape 19 to drop from the tape path P–1 downwardly into the tape magazine 12 where the tape 19 rests in the random serpentine pattern shown in dashed line in the figure. This operation of the first tape driving unit 21 also causes the tape 19 in the tape path P–2 to be slack. However, because the friction member 28 and the erasing unit 29 restrict movement of the tape 19 from the tape path P–1 to the tape path P–2, the operation of the second tape driving unit 23 to feed the tape 19 into the tape magazine 12 only causes the tape 19 to drop from the tape path P–3 downwardly into the zone Z.

Thus, the tape paths P–1, P–2, and P–3 of the tape 19 within the tape magazine 12 when substantially all of the tape 19 has been removed from the tape magazine 12 serve to define the sides of the zone Z so that motion of the tape 19 into the zone Z during or immediately following this operating condition of the tape device 10 is restricted to that slight motion of the tape 19 from the tape path P–2 which results from the tape 19 being fed into the tape magazine 12 by the first tape driving unit 21 and to that motion of the tape 19 from the tape path P–3 which results from the tape 19 being fed into the tape magazine 12 by the second tape driving unit 23. However, it will be understood that even when the tape 19 is in the tape paths P–1, P–2, and P–3 within the tape magazine 12, the zone Z within the tape magazine 12 is sufficiently large to receive a substantial amount of the tape 19 as it is fed into the tape magazine 12 by the second tape driving unit 23 without any portions of the tape 19 becoming entangled with each other or with that segment of the tape 19 in the path P–1. In addition, it will be understood that the tape paths P–1, P–2, and P–3 of the tape 19 within the tape magazine 12 provided by the rollers 24, 25, 26, and 27 not only define a zone Z within the tape magabine 12 for receiving a substantial length of the tape 19 fed into the tape magazine 12 by the second tape driving unit 23, but also define positions of the tape 19 for the reliable operation of various control elements such as a motion restricting means.

In that embodiment of the invention disclosed herein, the pin 31 of a motion restricting means such as that in U.S. patent application Ser. No. 553,506 is positioned adjacent that side of the zone Z defined by the tape path P–2 of the tape 19. The pin 31 is biased to the right as viewed in the figure and lateral motion of the pin 31 to the left as viewed in the figure causes both the first tape driving unit 21 and the second tape driving unit 23 to be inoperative to remove the tape 19 from the tape magazine 12.

It will be understood that when the tape 19 is slack between the rollers 25 and 26, the tape 19 is easily deflected from the tape path P–2 to the right and into the zone Z by the pin 31. However, when the tape 19 is forced into the path P–2 because substantially all of the tape 19 is removed fro mthe tape magazine 12, the motion of the tape 19 moves the pin 31 to the left and into the position shown in the figure to provide that motion of a pin 31 required by a motion restricting means such as that disclosed in U.S. patent application Ser. No. 553,506.

The use of a tape path P–1, P–2, or P–3 for the reliable operation of a control element is also shown by positioning a switch member 32 of a sensing means such as that disclosed in U.S. patent application Ser. No. 672,797 adjacent the tape path P–3. When the switch member 32 is operated by the placing of the tape 19 in the tape path P–3, such a sensing means may be for indicating that there is no tape 19 in the zone Z or for indicating that the tape device 10 is operating in a mode of operation which removes from the tape magazine 12 that tape 10 which has been fed into the tape magazine 12 only by the first tape driving unit 21.

This is because the tape 19 is in the tape path P–3 at all times other than when the second tape driving unit 23 has been operated in that mode of operation which feeds the tape 19 into the zone Z and has not been operated in that mode of operation which removes the tape 19 from the tape magazine 12 for a sufficient period of time to remove all of the tape 19 from the zone Z. Thus, the switch member 32 is operative when there is no tap 19 in the zone Z and when the second tape driving unit 23 is moving the tape 19 out of the tape magazine 12 from below the zone Z rather than from the zone Z. It will be understood that the concurrent operation of the switch member 32 and the second tape driving unit 23 serve to remove the tape 19 from the tape magazine 12 by the second tape driving unit 23.

It is because the zone Z formed by the zone means provided by the rollers 24, 25, 26, and 27 is a space within the tape magazine 12 for receiving the tape 19 without portions of the tape 19 becoming entangled that a tape device 10 having a zone means provides a tape device 10 which avoids the entanglement of the tape 19 which is characteristic of a prior art tape device while at the same time providing for the erasing means and for the motion restricting means and other control elements which are required by a practical tape device 10. It is because of the plurality of tape paths P–1, P–2, and P–3 provided by the rollers 24, 25, 26, and 27 that a tape device 10 having a zone means provides for more reliable operation of a motion restricting means and other control elements than has been possible in a prior art tape device.

What is claimed is:

1. In a tape device having a tape magazine into which tape is fed by both a first tape driving unit and a second tape driving unit, zone forming means operative to form a zone which is positioned within said tape magazine so that said first tape driving unit feeds tape into said tape magazine outside said zone and said second tape driving unit feeds tape into said tape magazine inside said zone, said zone forming means being operative to form said zone during an operating condition of said tape device in which tape is fed into said tape magazine by said first tape driving unit and inoperative to form said zone during an operating condition of said tape device in which tape is removed from said tape magazine by said first tape driving unit.

2. The tape device of claim 1 in which said zone is a space within said tape magazine which is sufficiently large to receive a substantial length of said tape.

3. In a tap device having a tape magazine into which a tape is fed and from which said tape is removed by a tape driving unit, zone forming means operative to form a zone which is positioned within said tape magazine so that said tape driving unit feeds said tape into said tape magazine only into said zone and removes said tape from said tape magazine from outside said zone, said zone forming means being operative to form said zone during an operating condition of said tape device in which said tape is fed into said tape magazine by said tape driving unit and inoperative to form said zone during an operating condition of said tape device in which said tape is removed from said tape magazine by said tape driving unit.

4. The tape device of claim 3 in which said zone means positions a length of said tape to form said zone.

5. In a tape device having a tape magazine into which a tape is fed and from which said tape is removed by a tape driving unit, zone forming means operative to form a zone which is positioned within said tape magazine so that said tape driving unit feeds said tape into said tape magazine only into said zone and removes said tape from said tape magazine in sequence from inside said zone and from outside said zone, said zone forming means being operative to form said zone during an operating condition of said tape device in which said tape is fed into said tape magazine by said tape driving unit and inoperative to form said zone during an operating condition of said tape device in which said tape is removed from said tape magazine by said tape driving unit.

6. The tape device of claim 5 in which said zone means positions a length of said tape to form said zone.

7. In a tape device having a tape magazine into which a tape is fed by a tape driving unit, zone forming means operative to position a length of said tape within said tape magazine to form a zone into which said tape driving unit feeds said tape, said zone forming means being operative to position said length of said tape during an operating condition of said tape device in which said tape is fed into sad tape magazine by said tape driving unit and inoperative to position said length of said tape during an operating condition of said tape device in which said tape is removed from said tape magazine by said tape driving unit.

8. In a tape device having a tape magazine into which tape is fed by both a first tape driving unit and a second tape driving unit, a zone means for forming a zone which is positioned within said tape magazine so that said first tape driving unit feeds tape into said tape magazine outside said zone and said second tape driving unit feeds tape into said tape magazine inside said zone, said zone means being constructed and arranged to form said zone within said tape magazine by placing tape in a plurality of predetermined tape paths.

9. The tape device of claim 8 in which one of said plurality of predetermined tape paths extends downwardly within said tape magazine and another of said plurality of predetermined tape paths extends laterally in said tape magazine from said one of said plurality of predetermined tape paths.

10. In a tape device having a tape magazine into which tape is fed by both a first tape driving unit and a second tape driving unit, a zone means for forming a zone which is positioned within said tape magazine so that said first tape driving unit feeds tape into said tape magazine outside said zone and said second tape driving unit feeds tape into said tape magazine inside said zone, said zone means including a plurality of rollers positioned in spaced relation within said tape magazine.

11. In a tape device having a tape magazine into which tape is fed by both a first tape driving unit and a second tape driving unit, a zone means for forming a zone which is positioned within said tape magazine so that said first tape driving unit feeds tape into said tape magazine outside said zone and said second tape driving unit feed tape into said tape magazine inside said zone, said zone means being constructed and arranged to form a side of said zone by placing tape in a predetermined tape path during a particular mode of operation of said second tape driving unit which removes tape from said tape magazine and said tape device including switch means responsive to tape in said predetermined tape path for indicating that tape is in said predetermined tape path.

12. The tape device of claim 11 in which said second tape driving unit feeds tape into said tape magazine inside said zone during a mode of operation other than said particular mode of operation by placing tape in a plurality of tape-paths other than said predetermined tape path.

13. The tape device of claim 11 in which tape is placed in said predetermined tape path by said zone means only when tape is restricted in said tape magazines to sides of said zone.

14. The tape device of claim 11 in which said switch means is operative to render said second tape driving unit inoperative to remove tape from said tape magazine.

15. In a tape device having a tape magazine into which tape is fed and from which tape is removed by a tape driving unit, zone means for forming a zone which is positioned within said tape magazine so that said tape driving unit feeds tape into said tape magazine into said zone and removes tape from said tape magazine from outside said zone, and means for indicating when said tape driving unit is removing tape from said tape magazine from outside said zone.

References Cited

UNITED STATES PATENTS

| | | | |
|---|---|---|---|
| 1,341,108 | 5/1920 | Burnett | 226—118 X |
| 2,988,604 | 6/1961 | Nye. | |
| 3,183,494 | 5/1965 | Welsh. | |
| 2,288,983 | 7/1942 | Weiss. | |

RICHARD A. SCHACHER, Primary Examiner